US008695205B2

(12) United States Patent
Moyer et al.

(10) Patent No.: US 8,695,205 B2
(45) Date of Patent: Apr. 15, 2014

(54) METHOD AND APPARATUS FOR ATTACHING A CUTTING BLADE TO A SUBSTRATE

(75) Inventors: Joshua Q. Moyer, Quakertown, PA (US); Jeffrey L. Schroy, Coopersburg, PA (US); Jonathan C. Tyson, Bethlehem, PA (US); David J. Dravuschak, Coplay, PA (US); Andrew Levan, Moorestown, NJ (US); Joseph M. Dorner, Jr., Oak Island, NC (US); Leonard C. Wagner, Coopersburg, PA (US); Christopher Yatsko, Bluebell, PA (US); Stephen F. Smith, Warminster, PA (US); James W Day, Feasterville, PA (US)

(73) Assignee: Metal Edge International, Inc., North Wales, PA (US)

( * ) Notice: Subject to any disclaimer, the term of this patent is extended or adjusted under 35 U.S.C. 154(b) by 1083 days.

(21) Appl. No.: 12/651,661

(22) Filed: Jan. 4, 2010

(65) Prior Publication Data

US 2010/0170197 A1 Jul. 8, 2010

Related U.S. Application Data

(60) Provisional application No. 61/142,979, filed on Jan. 7, 2009.

(51) Int. Cl.

| | |
|---|---|
| ***B23P 15/00*** | (2006.01) |
| ***B23P 23/04*** | (2006.01) |
| ***B23P 19/04*** | (2006.01) |

(52) U.S. Cl.

USPC .......................................................... 29/564.6

(58) Field of Classification Search

USPC .......... 29/564.8, 564.6, 33 Q, 33 S, 509, 505; 72/306–307, 405.01, 404; 225/49

See application file for complete search history.

(56) References Cited

U.S. PATENT DOCUMENTS

| | | | | |
|---|---|---|---|---|
| 3,880,020 A | 4/1975 | Clem | | |
| 4,041,753 A | 8/1977 | Hix | | |
| 5,067,222 A * | 11/1991 | Frank et al. | ...................... | 29/411 |
| 5,947,360 A * | 9/1999 | Frank | .............................. | 225/39 |
| 5,984,158 A * | 11/1999 | Frank | .............................. | 225/91 |
| 6,491,198 B1 * | 12/2002 | Frank | .............................. | 225/39 |
| 2002/0066299 A1 | 6/2002 | Park | | |
| 2006/0169112 A1 | 8/2006 | Frank | | |
| 2010/0089782 A1 * | 4/2010 | Lo Duca | ....................... | 206/389 |

OTHER PUBLICATIONS

International Search Report and Written Opinion dated Aug. 13, 2010 issued in International Patent Application No. PCT/US10/20035.

Metal Edge International Bench Model Edger User's Manual, dated prior to Jan. 6, 2009, 65 pages.

* cited by examiner

*Primary Examiner* — Erica E Cadugan

(74) *Attorney, Agent, or Firm* — Stephen H. Eland; Dann, Dorfman, Herrell & Skillman

(57) ABSTRACT

A method and apparatus are provided for attaching a safety cutting blade onto a substrate, such as a cardboard blank. A piece of cutting blade material is cut to length and fed to a forming station that bends the piece to form a safety cutting blade having a plurality of cutting teeth. The cutting blade is fed to a crimping station where the cutting blade is mated with a substrate and affixed with the substrate. A transport then conveys the combined cutting blade and substrate away from the crimping station.

25 Claims, 16 Drawing Sheets

SUPPLY OF CUTTING GRADE STOCK IN THE FORM OF A COIL OF OVERLAPPING CONVOLUTIONS OF CUTTING BLADE MATERIAL

Fig. 17

AN ALTERNATIVE EMBODIMENT WHEREIN THE ANVIL OF THE BENDING STATION INCLUDES AN ELONGATED RECESS FOR RECEIVING THE TEETH OF THE CUTTING BLADE SO THAT THE TEETH DO NOT ENGAGE THE ANVIL

Fig. 18

AN ALTERNATIVE EMBODIMENT WHEREIN THE CRIMPING BAR OF THE AFFIXING STATION INCLUDES A RECESS FOR RECEIVING THE TEETH OF THE CUTTING BLADE SO THAT THE TEETH DO NOT ENGAGE THE CRIMPING BAR DURING THE AFFIXING OF THE CUTTING BLADE TO THE SUBSTRATE AT THE AFFIXING STATION

Fig. 19

METHOD AND APPARATUS FOR ATTACHING A CUTTING BLADE TO A SUBSTRATE

PRIORITY CLAIM

This application claims priority to U.S. Provisional Patent Application No. 61/142,979, filed Jan. 7, 2009. The foregoing application is hereby incorporated by reference.

FIELD OF THE INVENTION

The present invention relates to the field of cutting blades for cutting sheet material such as film or aluminum foil. More specifically, the present invention relates to a system operable to automatically form a cutting blade and attach it to a substrate such as a cardboard box.

BACKGROUND

In recent years, there has been a move toward using safety blades for cutting plastic film and aluminum foil. In particular, safety blades have been frequently used for large commercial rolls of plastic film and aluminum foil. Such safety blades cut the film or foil while minimizing the possibility of cutting the user.

Although the safety cutting blades have been well received, the known safety blades have configurations that are more complicated than the known serrated blades. Since the cutting blades are typically attached to a substrate, such as the cardboard box that contains the roll of film, the more complicated geometry of the cutting blade complicates the attachment of the cutting blades to the cardboard boxes.

SUMMARY OF THE INVENTION

In light of the foregoing, a system is provided for forming and attaching cutting blades to substrates. A feeder feeds a strip of cutting blade to a cutting station. The cutting station severs the strip to form a cutting blade blank. The blank is fed to a bending station that bends the blank to form a blade. From the bending station, the blade is conveyed to a crimping station for attaching the blade to a substrate. An automatic conveyor feeds a substrate, such as cardboard, to the crimping station and inserts an edge into the channel of the blade to register the substrate at the proper location relative to the cutting blade. The blade is then attached to the substrate, such as by crimping the blade and/or staking the blade to the substrate. The automatic conveyor then conveys the blade and substrate assembly away from the crimping station and discharges the assembly into an output bin.

These and other aspects of the present invention are described in greater detail in the accompanying detailed description.

DESCRIPTION OF THE DRAWINGS

The foregoing summary and the following detailed description of the preferred embodiments of the present invention will be best understood when read in conjunction with the appended drawings, in which:

FIG. 17 schematically shows the supply of cutting blade stock.

FIG. 18 schematically shows an alternative embodiment wherein the anvil of the bending station includes an elongated recess for receiving the teeth of the cutting blade so that the teeth do not engage the anvil.

FIG. 19 schematically shows an alternative embodiment wherein the crimping bar of the affixing station includes a recess for receiving the teeth of the cutting blade so that the teeth do not engage the crimping bar during the affixing of the cutting blade to the substrate at the affixing station.

DETAILED DESCRIPTION OF THE INVENTION

Figure 1:
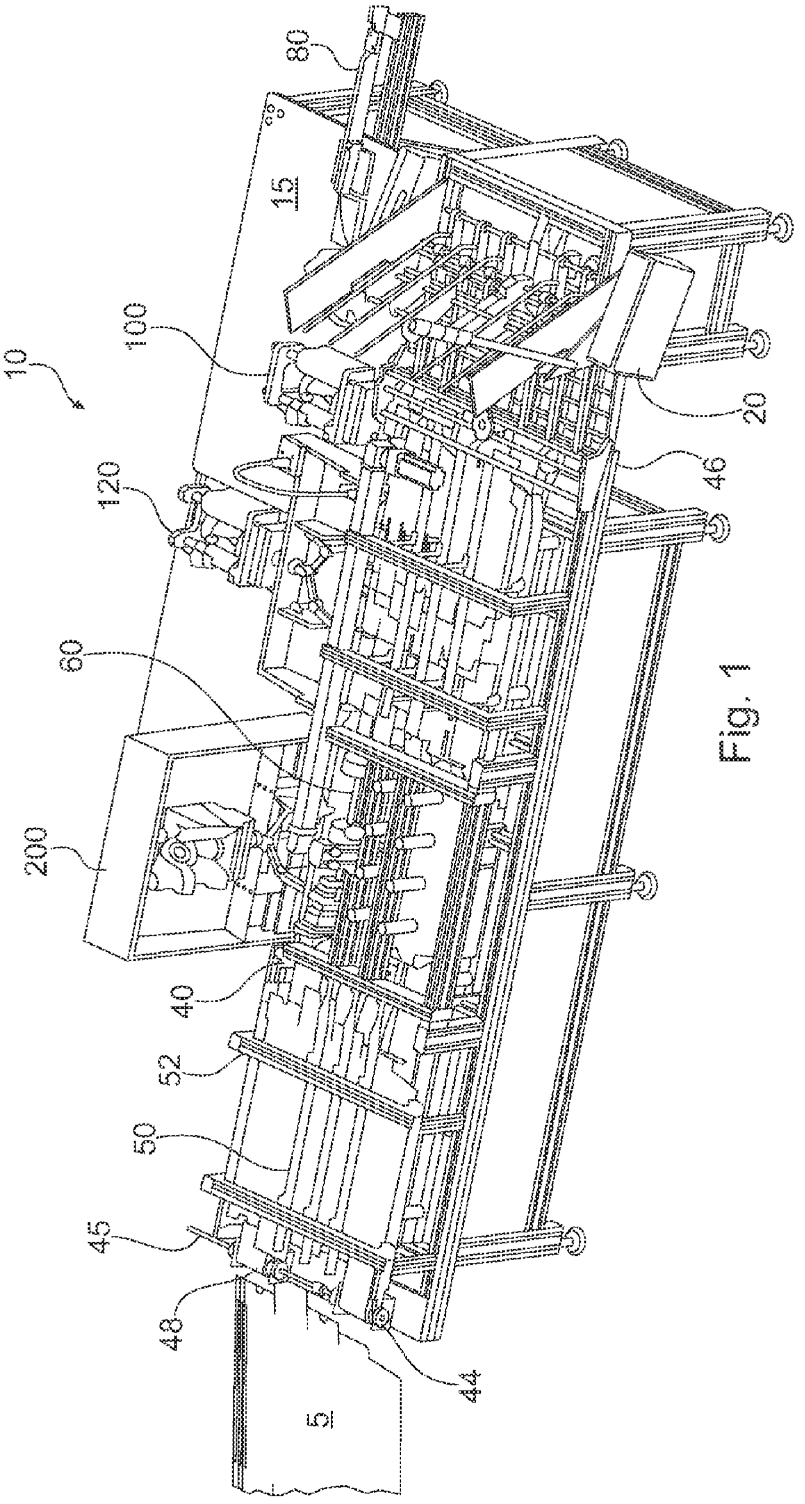
FIG. 1 is a perspective view of an apparatus for forming and attaching a cutting blade to a substrate.

Referring now to the figures in general and to FIG. 1 in particular, a system for forming a cutting blade and mounting the cutting blade on a substrate is designated generally 10. The system 10 is operable to form a blade assembly 5 that includes a blade 7 fixedly mounted onto a substrate 9, such as the blade assembly illustrated in FIG. 1. The system 10 is configured to operate automatically with a minimum of operator intervention.

Figure 16:
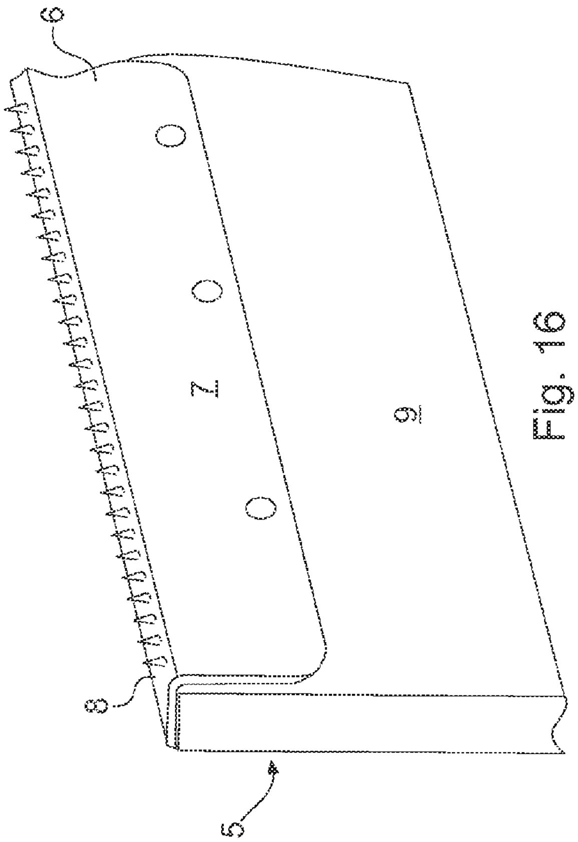
FIG. 16 is an enlarged perspective view of an exemplary blade assembly produced by the system illustrated in FIG. 1.

The system can be used to form a variety of blade assemblies 5. Referring to FIG. 16, in the present instance, the blade is a safety blade designed to prevent injury to the user. Accordingly, in the present instance, an exemplary blade is shown, which includes a first leg 6 that is connected with a face of the substrate 9, and a second leg or web 8 that overlies the side edge of the substrate. The teeth of the cutting blade project outwardly from the web. Additionally, in the present instance, the cutting blade includes a leg that is parallel to the first leg (See FIG. 16), so that the cutting blade forms a channel and the substrate is sandwiched within the channel of the cutting blade.

The cutting blade may have any of a variety of tooth configurations. For example, one exemplary tooth configuration is illustrated in U.S. Pat. No. 6,491,198. The entire disclosure of U.S. Pat. No. 6,491,198 is hereby incorporated herein by reference. A second exemplary cutting blade tooth configuration is illustrated in U.S. patent application Ser. No. 11/343,197, which published on Aug. 3, 2006 as publication no. 2006/0169112. The entire disclosure of U.S. patent application Ser. No. 11/343,197 is hereby incorporated herein by reference.

In the present instance, the substrate 9 is a flat piece of corrugated cardboard. Specifically, in the present instance, the substrate 9 is a preformed box flat that can be folded into a container for containing a roll of sheet material. The sheet material may be any of a variety of materials, such as plastic film or aluminum foil. Additionally, although the substrate is a cardboard box blank in the present instance, the substrate may be formed of an alternate material. Such an alternate material would desirably be partially compressible and have sufficient strength to withstand the forces applied to the face onto which the cutting blade 7 is attached. Specifically, during use, a length of sheet material is pulled from the roll in the box and pulled downwardly over the cutting blade to sever the piece of sheet material from the roll. Such forces may tend to tear or rip the substrate. Therefore, the substrate should have sufficient strength to resist tearing during use. In addition to cardboard, such as corrugated cardboard, a suitable substrate may be formed of plastic, compostable plastic or other such material.

In the following discussion, the system 10 is described in connection with creating blade assemblies 5 that incorporate a safety blade on a cardboard box. However, it should be recognized that such a blade assembly is merely an exemplary assembly, and is not intended to limit the possible blade assemblies that may be formed by the system. Additionally, in the following description, the substrate 9 onto which the blade 7 is attached is referred to a cardboard box or flat. However, it should be understood that this is merely an exemplary substrate and is not intended to imply a limitation on the type or variety of substrates that can be processed by the system 10.

Brief Overview

Referring to FIG. 1, the system includes a feeder 20 for feeding substrates, such as cardboard box flats 9. The feeder 20 is operable to receive a stack of cardboard flats and serially feed the flats to a substrate transport 40. The substrate transport conveys each flat through the system before discharging the blade assembly 5 to a discharge area, such as an output bin.

The system 10 includes a plurality of stations for handling and forming the cutting blades. In the present instance, the first station is a supply station 80 that stores a supply of material that is to be formed into the cutting blades. A blade stock feeder 90 feeds the blade stock from the supply station 80 toward a cutting station 100. The cutting station 100 severs a length of blade stock to form a blade blank.

A blade bending station 120 bends the blade blank into a shape configured to facilitate mounting the blade onto the cardboard blank. The bent blade is conveyed to a crimping station 200. At the crimping station 200 a cardboard blank is mated with the bent blade and the blade is crimped and/or staked onto the cardboard blank to fixedly attach the blade to the cardboard blank. The completed blade assembly is then discharged and stacked at a discharge area.

With the foregoing overview in mind, the details of the apparatus 10 will now be described in greater detail.

Cardboard Handling System

The cardboard blanks are handled by two assemblies. The first assembly is the cardboard feeder 20 that receives a stack of cardboard blanks and serially feeds the cardboard blanks to the cardboard transport 40. The cardboard transport receives the cardboard blanks from the feeder and conveys the cardboard through the system until the cutting blade is attached and the completed blade assembly 5 is discharged to an output bin.

Cardboard Feeder

Figure 2:
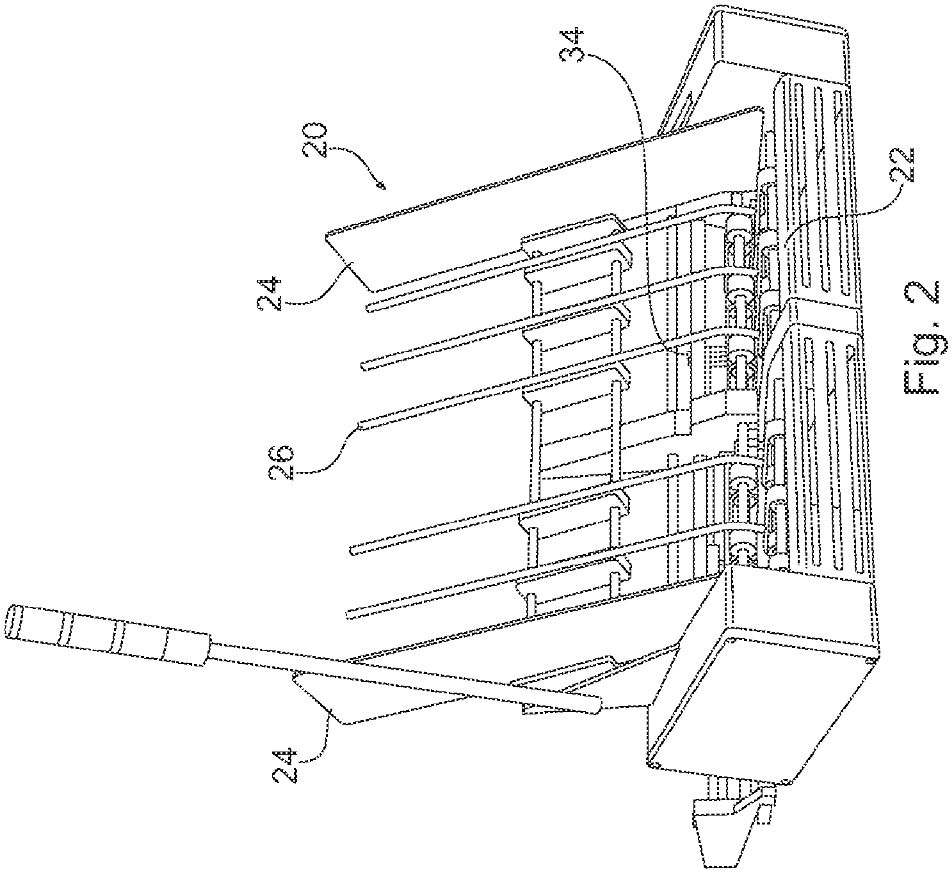
FIG. 2 is a perspective view of a feeder for feeding substrates.
Figure 2A:
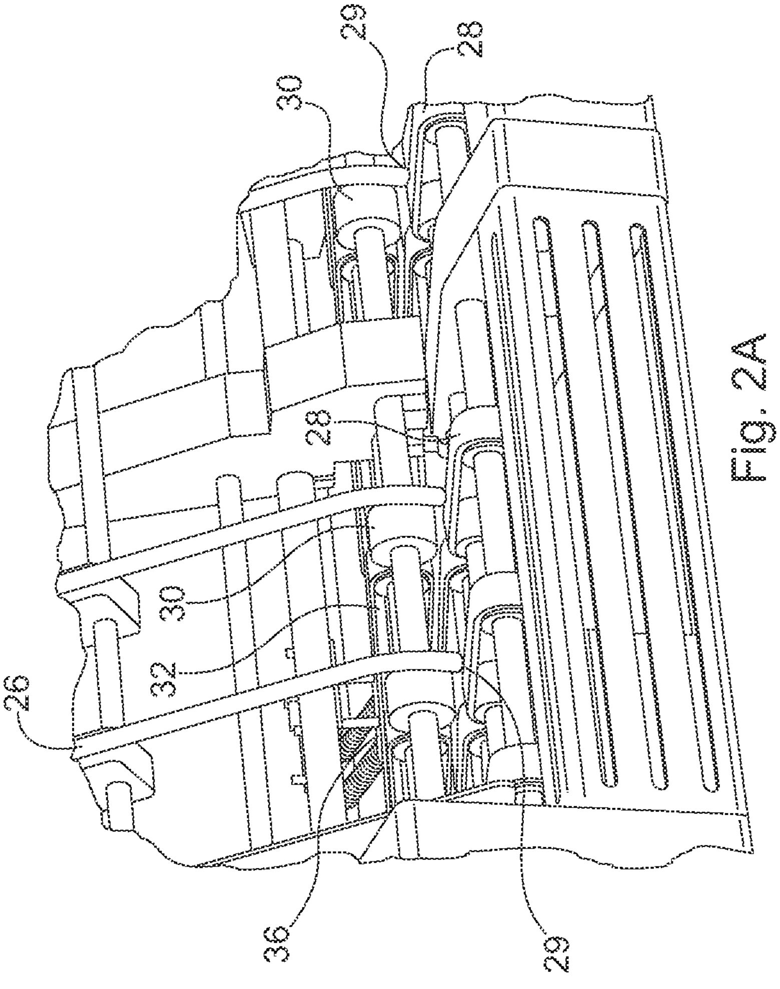
FIG. 2A is an enlarged fragmentary perspective view of the feeder illustrated in FIG. 2.

Referring now to FIGS. 2 and 2A, the details of the cardboard feeder 20 will be described in greater detail. The cardboard feeder 20 includes an input bin or input area 22 for receiving a stack of substrates 9, which in the present instance are cardboard box blanks. The input area 22 may include a plurality of support arms that extend rearwardly from the input area to support elongated box blanks. The input area 22 includes side guides 24 that extend vertically upwardly. The side guides 24 are spaced apart from one another a distance that is approximately equal to the width of the cardboard blanks 9. Additionally, the side guides can be adjusted toward or away from one another to accommodate varying-sized cardboard blanks.

A plurality of guide rods 26 supports the forward edges of the stack of cardboard blanks in the input area. In the present instance, the lower end of each guide rod curves forming an angled guide to guide each blank toward a feed slot 29 through which the cardboard blanks are fed. Additionally, in the present instance, the guide rods are disposed at a transverse angle relative to the stack of blanks to facilitate shingling of the stack of blanks in the input area 22. The guide rods 26 are mounted onto a frame that also supports the side guides 24. The frame is pivotable so that the guide rods and side guides can be pivoted to change the angle of the guide rods relative to the stack of blanks.

A plurality of parallel spaced apart feed belts 28 engage the bottom blank in the stack of cardboard blanks in the input area 22. The feed belts 28 are high friction belts designed to engage the bottom blank in the stack and feed the blank toward the feed slot 29. In the present instance, the feed slot 29 is formed between the upper surface of the feed belts and the lower edge of the guide rods 26. The feed slot is greater than the thickness of a single cardboard blank, but less than twice the thickness of a cardboard blank. In this way, the thickness of the feed slot impedes two blanks from being fed at the same time, which could lead to a jam or other malfunction of the system 10.

The feed belts 28 extend through the feed slot 29 toward a plurality of belts 32 that convey the blanks 9 away from the input area 22 and toward the cardboard transport 40. The conveyor belts 32 are pairs of belts. A plurality of belt pairs is spaced apart across the width of the feeder 20. Each pair 32 comprises an upper belt and an opposing lower belt. The blanks are fed into a gap between the upper and lower belts, so that the upper belts engage the upper face of each blank and the lower belts engage the lower face of each blank. In this way, the opposing belts 32 convey the blanks forwardly away from the input bin when the belts are driven forwardly.

In the present instance, the feeder also includes a plurality of stripper wheels 30. The stripper wheels 30 are positioned adjacent the guide rods 26. The stripper wheels engage the lead edge of the bottom blank in the stack so that the bottom blank is nipped between the stripper wheels 30 and the feed belts 28. The feed belts 28 drive the bottom blank forwardly, while the stripper wheels drive rearwardly toward the input bin to prevent a second blank from being fed with the bottom blank. The stripper wheels have a coefficient of friction that is lower than the coefficient of friction of the feed belts 28 to impede the feeding of two cardboard blanks. As shown in FIG. 2A, the stripper wheels 30 are mounted onto a shaft. The shaft can be adjusted vertically to vary the distance between the stripper wheels and the feed belts 28.

The feeder 20 may include a feed sensor 36 positioned along the feed conveyor belts 32. For instance, the feed sensor 36 may be positioned adjacent the discharge end of the feeder. The feeder may be an optical sensor that detects whether cardboard is present or not at the sensor location. Since the conveyor belts 32 convey the cardboard at a known rate, the length of time between gaps between subsequent cardboard blanks can be used to determine the length of the cardboard blank. In this way, if the length of time is greater than the anticipated time length, the system may assume that subsequent cardboard blanks are overlapping or that the system is jammed. The feeder 20 may also include one or more adjustment knobs 34 for adjusting the distance between the upper and lower conveyor belts 32 to accommodate cardboard blanks of varying thickness.

Although the feeder 20 described above is particularly suited for feeding cardboard blanks, it should be appreciated that the feeder is an exemplary embodiment. For instance, rather than using belts and/or rollers to pull a piece from a stack, the feeder may use an element to push a blank from the stack, such as using a pusher arm. Alternatively, a gravity feed mechanism can be used that uses gravity to feed the bottom piece, while relying on a stop element to limit the feeding to a single piece at the time. Additionally, rather than use a feeder that feeds the bottom piece from a stack, the feeder may be a top feeder that feeds the top piece from a stack. Still further, rather than using a feeder with a vertical stack, the system can use a feeder with a horizontal stack, so that the pieces are disposed on edge in the input bin. In such an arrangement, a pusher may push the stack toward a feed nip or suction cup that may feed the lead piece from the stack. After the lead piece is fed from the stack it may be re-oriented into a generally horizontal orientation for processing in accordance with the station as described further below. Accordingly, it should be appreciated that the configuration and orientation of the feeder is not limited to a particular structure that is operable with the present system. However, the feeder should be operable to serially feed pieces from a stack.

Cardboard Transport

Figure 3:
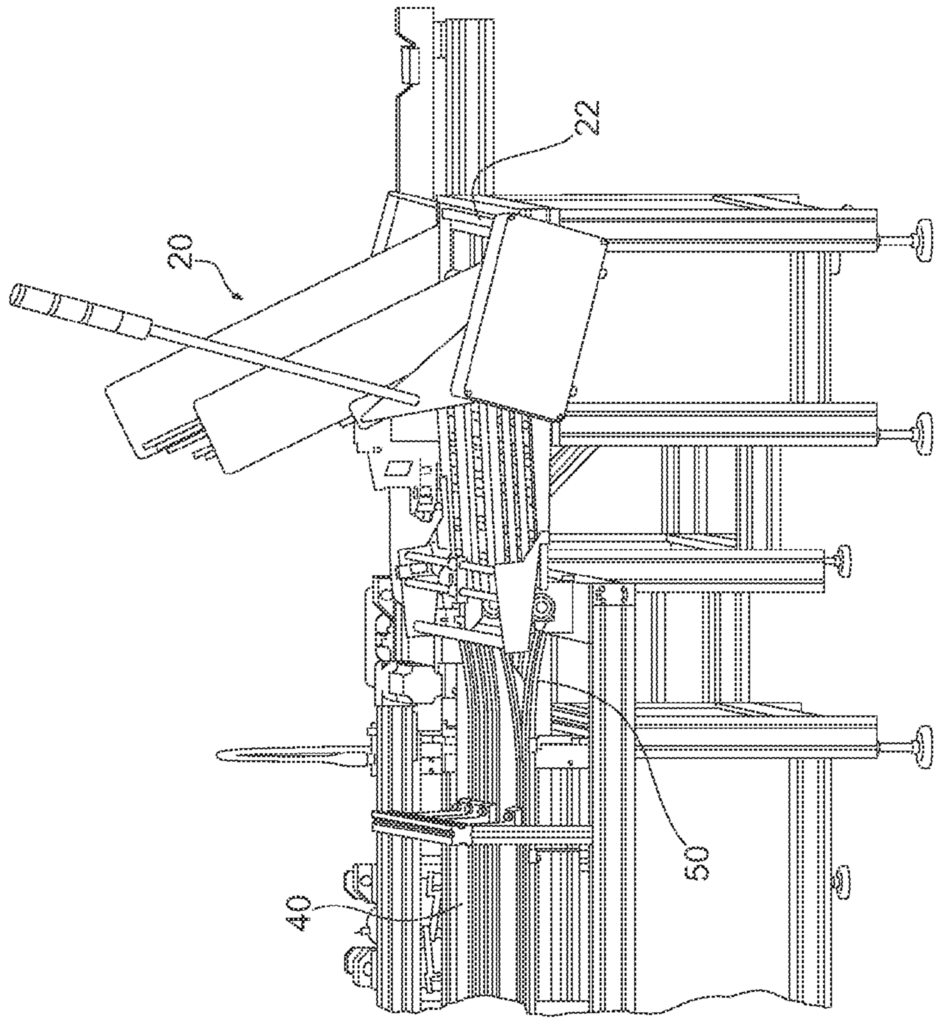
FIG. 3 is an enlarged perspective view of a conveyor of the apparatus of FIG. 1.
Figure 4:
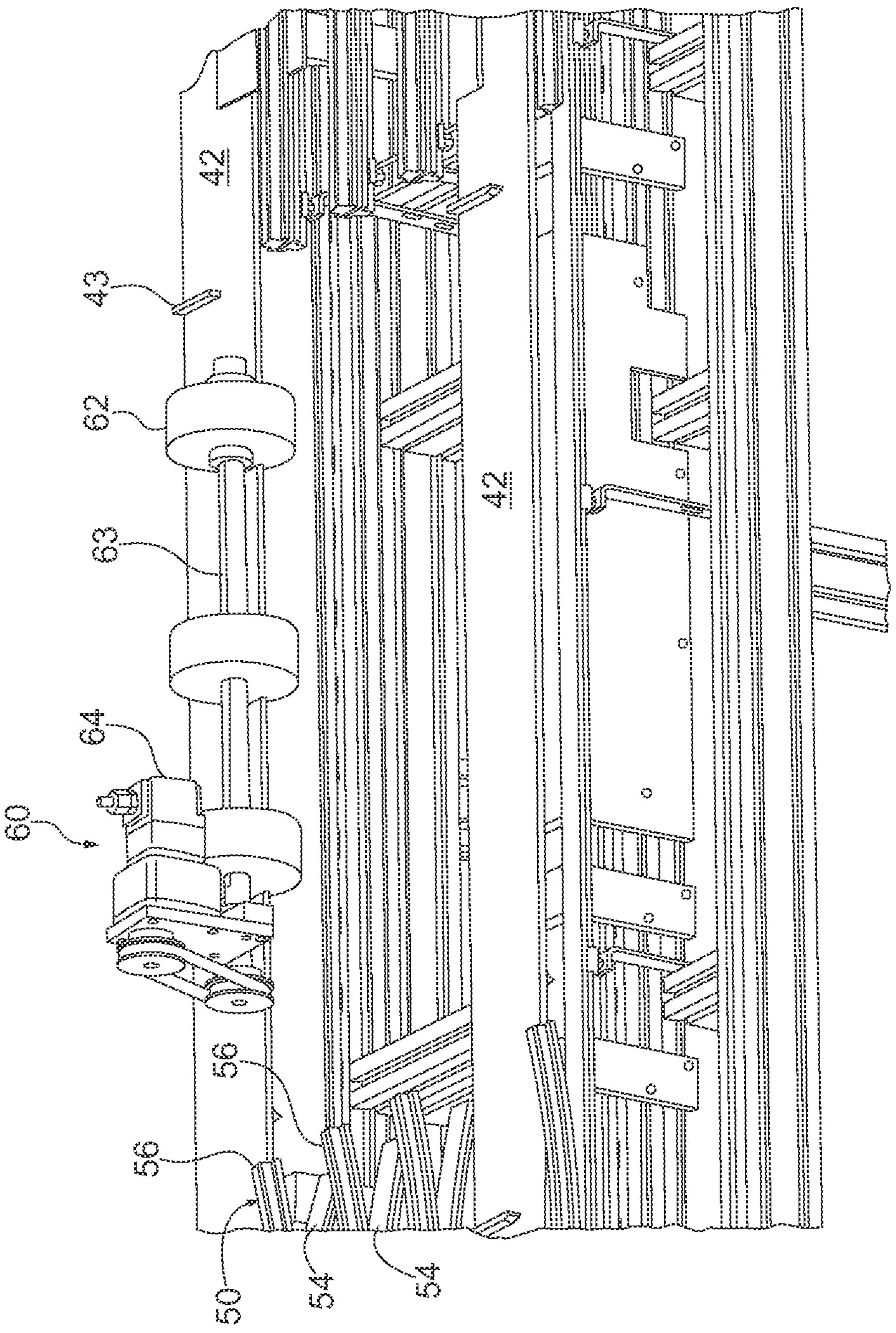
FIG. 4 is an enlarged perspective view of a transverse feeder of the conveyor illustrated in FIG. 3.

Referring to FIGS. 1, 3 and 4, the cardboard transport 40 is designed to receive the cardboard blanks from the feeder 20 and transport the blanks through the rest of the system. The cardboard transport 40 includes one or more conveyor belts 42 that drive the cardboard blanks from the input end 46 adjacent the feeder to the output or discharge end 48 remote from the feeder.

In the present instance, the cardboard transport 40 includes a pair of parallel spaced-apart conveyor belts 42, however, the transport may be configured with a single wide belt or a plurality of narrower belts depending on various parameters for each application, such as the size of the cardboard blank.

The conveyor belts 42 are elongated belts entrained about head pulleys 44 and tail pulleys that are idler pulleys. The head pulleys are driven by a drive shaft 45. In the present instance, the conveyor belts are tensioned and are supported by a plurality of supports to keep the conveyor belts from sagging. The conveyor belts also include a plurality of flights 43 projecting upwardly from the top surface of the conveyor belts. The flights 43 are configured to engage the trailing edge of the cardboard blanks to prevent the cardboard blanks from slipping as they are conveyed through the system. In this way, the flights operate as stops to position the cardboard blanks as the blanks are conveyed.

As shown in FIG. 4, the flights 43 are generally flat lugs that extend across a substantial portion of the width of the conveyor belts. The flights 43 are attached at regular intervals along the length of the conveyor belts. Although the configuration of the flights may vary depending on the configuration of the cardboard blanks, in the present instance, the flights are generally elongated rectangular structures have a generally flat front face for engaging the trailing edge of the cardboard blanks.

The cardboard transport 40 further includes a guide system 50 that guides and supports the cardboard blanks as the blanks are conveyed along the transport. The guide system includes a plurality of elongated guides 54, 56 that extend along the length of the transport 40. The guides are formed of a low friction material, such as plastic so that the blanks can readily slide along the guides as the conveyor conveys the blank. The guides 54, 56 are mounted in pairs, so that an upper rail 56 overlies and is parallel with a corresponding lower guide rail 54. The rails are separated by a distance that is approximately the same as the thickness of the blanks.

In the present instance, the upper guides 56 are supported by a support frame 52 in the form of beams that extend across the width of the transport and arms that extend down from the beams. In this way, the upper guide rails 56 are supported from above the conveyor belts 42 without interfering with the operation of the conveyor belts.

Although the guide rails are generally parallel and flat guides, the upper and lower guides may flare apart from one another to form an enlarged input opening adjacent the feeder 20. Specifically, as shown in FIG. 3, adjacent the feeder 20, each of the upper guide rails 56 flares upwardly away from the corresponding lower guide rail 54, and each lower guide rail flares downwardly away from the upper guide rail. In this way, the enlarged opening between the upper and lower guide rails facilitates entry of the cardboard blank as the feeder 20 and the conveyor belts 42 convey a cardboard blank into the gap between the upper and lower guide rails.

The guide rails may extend along the entire length of the transport 40, however, as described further below, in the present instance, the transport includes a transverse drive section 60 that drives the blanks transverse the length of the conveyor belts and guide rails. Referring to FIG. 4, the details of the transverse transport 60 will be described in greater detail.

The transverse transport 60 is designed to drive the cardboard blanks across the width of the transport 40 rather than along the length of the transport. Accordingly, in the present instance, the guide rails 54, 56 terminate adjacent the transverse transport, so that the guide rails do not impede the transverse motion of the blanks.

The transverse transport comprises a plurality of drive wheels 62 mounted on an axle or drive shaft 63. The axle 63 is generally parallel to the length of the conveyor belts so that the drive wheel tends to impart a transverse drive force, across the width of the transport. The drive wheels 63 are formed of a high friction material, such as plastic or rubber, for frictionally engaging the cardboard blanks.

As the cardboard blanks are being conveyed to the transverse transport 60, the drive wheels 62 may interfere with the blanks. Accordingly, in the present instance, the drive wheels are displaceable to move the drive wheels out of the cardboard path as a blank is entering the transverse transport. Once the blank is conveyed into position in the transverse transport, the wheels are displaced into engagement with the blank so that the wheels can drive the blank transversely. Specifically, during operation, the drive wheels 62 drive the blank toward the crimping station 200 to place a side edge of the blank in proximity with a blade 7. After the blade is crimped onto the blank, the drive wheels 62 reverse to drive the blank and the attached blade transversely away from the crimping station. An actuator then raises the wheels to displace the wheels upwardly out of contact with the blank. The conveyor belts 42 then convey the blank away from the transverse transport 60 and toward the discharge or output bin. Additionally, as can be seen in FIG. 4, the upper and lower guide rails flare apart downstream from the transverse transport, similar to how the guide rails flare apart at the input end of the cardboard transport, adjacent the feeder 20.

Cutting Blade Stations

Referring to FIG. 1, the stations that process the cutting blade are disposed along the length of the cardboard transport 40, so that the cutting blade processing generally runs parallel with the transport of the cardboard blanks. In other words, the cutting blades are formed and conveyed at the same feed rate as the cardboard transport 40 to match the positioning of the blanks with a corresponding blade.

As shown in FIG. 1, the blade stock feeder 90, the cutting station 100, the bending station 120 and the crimping station 200 are mounted on a generally planar base plate 15, so that the stations are positioned at substantially the same height and are parallel with one another. The blades may be formed from blank stock that has not been pre-processed. For instance, the blank stock may simply be strips of the material from which the blades are formed, so that the blank material does not include a cutting edge. In such an application, the cutting edge is formed at an edge forming station, such as a station that may punch or cut teeth or another cutting element into the blade stock. However, in the present instance, the system 10 is configured to form the cutting blades out of blank stock that has already been pre-formed with a cutting edge. Specifically, in an exemplary embodiment, the blade stock is an elongated flat strip of material, such as metal, and the strip is pre-formed with a row of cutting teeth projecting upwardly along the length of the strip. Although, the system is particularly suited to process such blade stock to form blade assemblies 5, it should be understood that the system may be configured to process a variety of blade configurations using a variety of blade blanks.

The details of each blade processing station will now be described in greater detail.

Blade Stock Supply Station

Figure 5:
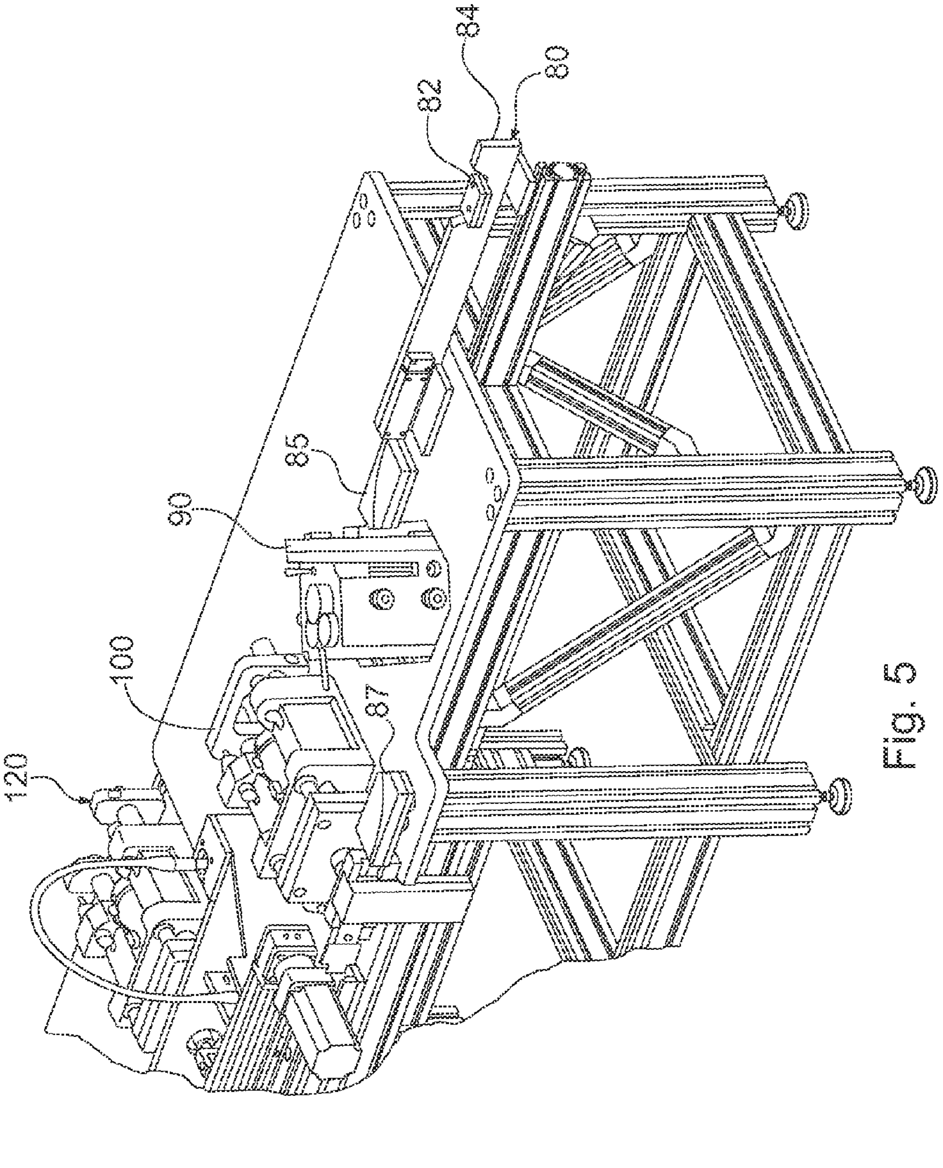
FIG. 5 is an enlarged perspective view of the system illustrated in FIG. 1, showing a blade stock feeder and cutting station.

Referring to FIG. 5, the system 10 includes a station for providing a generally continuous supply of blank material used for creating cutting blades. As discussed above, in the present instance, the blank material is an elongated strip of thin metal material. One way of providing a substantial supply of such material is to store the material in a coiled spool of blade stock. Specifically, cutting teeth are formed into a length of flat blade stock and the blade stock is wrapped into a plurality of overlapping convolutions to form a spool of blade stock material.

The blade stock supply station 80 includes an axle 82 for mounting a spool of blade stock. The spool is mounted onto the axle 82 so that the spool can rotate freely relative to the axle. The axle 82 is mounted on an arm 84 that projects outwardly and/or upwardly away from the base plate 15 to provide clearance between the base plate and the outer circumference of the spool.

The system 10 may include a curved guide 85 that guides the blade stock as it leaves the supply station. The curved guide 85 has a slot in which the blade stock rides. The guide block is configured and positioned so that the blade stock enters the guide block from the supply station 80 and exits being directed toward the entrance of the blade stock feeder 90.

Blade Stock Feeder

The blade stock feeder 90 feeds the blade stock from the coil in the supply station. In the present the stock feeder 90 includes a feed wheel that forms a nip with an opposing element such as an idler roller or a bearing. The feed wheel frictionally engages the blade stock, so that as the feed wheel rotates, the feed wheel drives the blade stock forwardly toward the cutting station. Additionally, in the present instance, the blade stock feeder includes a stepper motor for driving the drive wheel. The stepper motor provides precise control of the rotation of the drive wheel. Specifically, the system includes a controller that controls operation of the stock feeder motor. The system can precisely control the operation of the motor to precisely determine the number of rotations of the drive wheel, which in turn precisely controls the length of stock that the feeder feeds.

Since the blade stock may retain a bend from being coiled in the spool, a second guide 87 may be positioned between the blade stock feeder 90 and the cutting station 100. The curved guide 87 may provide a reverse curve to curve the metal in the opposite direction of the curve of the spool to help straighten the blade stock. Specifically, the curve of the second curved guide 87 is opposite of the curve of the first curved guide 85.

Blade Cutting Station

The blade stock feeder 90 feeds the blank cutting blade material to a cutting station that is operable to sever a length of the blade stock. Specifically, in the present instance, the stock feeder 90 feeds a length of blade stock to and through the cutting station so that the free end of the blade stock reaches a predetermined point in the bending station.

Figure 6:
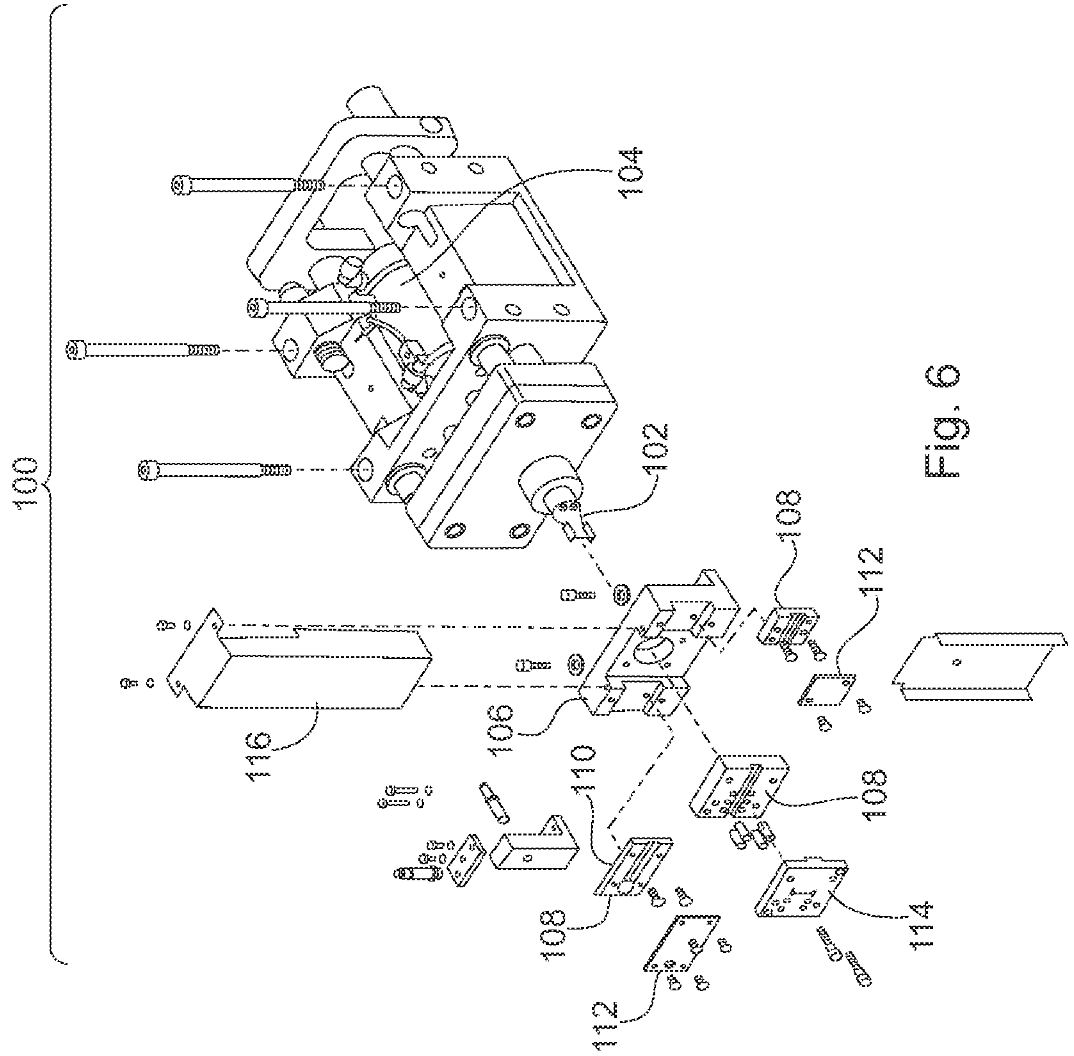
FIG. 6 is an exploded perspective view of a cutting station of the apparatus illustrated in FIG. 1
Figure 7:
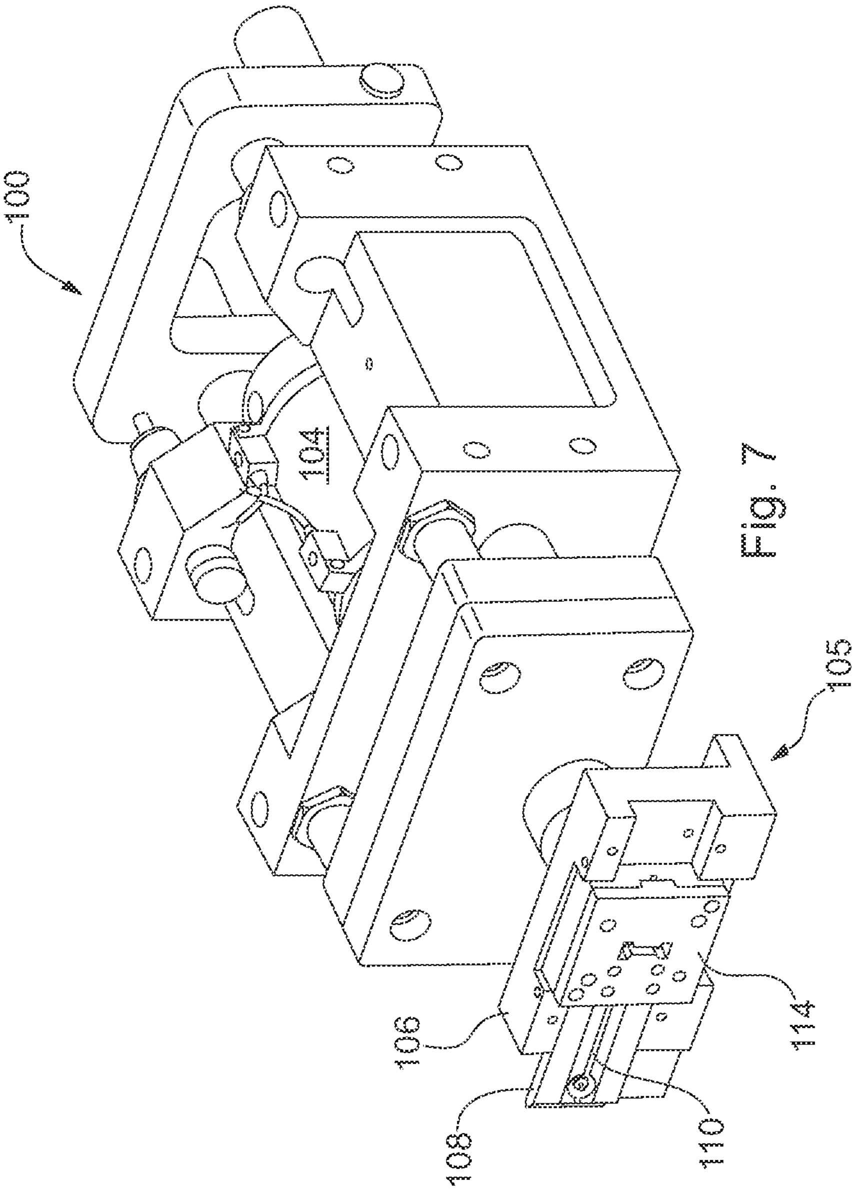
FIG. 7 is an enlarged perspective view of the cutting station illustrated in FIG. 6.

Referring to FIGS. 6-7, the details of the cutting station can be seen in greater detail. A variety of cutting elements may be used to cut a length of blade from the strip of blade stock. For instance, a knife or cutting wheel or other cutting element may be used to sever the blade stock. However, in the present instance, the cutting station 100 uses a punch 102 that cooperates with a corresponding die assembly 105. The punch 102 operates to sever the blade stock and form the ends of the blade stock.

The cutting station includes a pneumatic cylinder 104 that drives the punch 102 toward and away from the die assembly 105. The punch is formed so that it forms the ends of both sides of the cutting blade stock. Specifically, the punch includes a rounded profile to round the terminal edge on either side of the punch 102. In this way, when the punch severs a length of blade material it also rounds the trailing edge of the piece that is on the downstream side of the cutting station, while also rounding the leading edge of the piece that is on the upstream side of the cutting station.

The die assembly 105 includes a die 114 mounted in a die block 106. The die 114 has a die opening that corresponds to the shape of the punch. The die assembly further includes a plurality of guide inserts 108 mounted on the die block. The guide inserts 108 include a channel configured to guide the flat blade stock as it is fed into and through the die assembly 105. Additionally, each guide insert 108 includes a recess or relieved channel for receiving the teeth of the cutting blade blank. As the blade material passes through the die assembly 105, the cutting teeth ride in the recess so that the cutting teeth do not contact the die assembly. The guide inserts and the relieved channel can be seen most clearly in FIG. 7, which illustrates the cutting station with the die 114 removed.

The die 114 supports the blade material as the pneumatic cylinder 104 drives the punch through the die assembly. In this way, the die 114 prevents the blade material from bending when the punch severs the blade material. During use, the punch 102 drives through the blade material and punches out a piece of material similar to the shape of the punch. Since the punch has a height that is greater than the width of the blade stock, the punch servers the material when it punches a piece of material that is similar to the punch shape. The punched piece is driven out the forward end of the die so that the punched piece exits the dies assembly. In the present instance, a scrap chute 116 is mounted on the forward end of the die to receive the scrap pieces that are punched out of the blade material by the punch 102.

Blade Bending Station

After a length of blade material is cut from the blade stock, it is formed into a shape for mounting the blade material onto a cardboard blank 9. In the following description, the length of severed blade material is referred to as a blade blank before it is formed. After the blade material is formed at the bending station, the item is referred to as a cutting blade.

Figure 8:
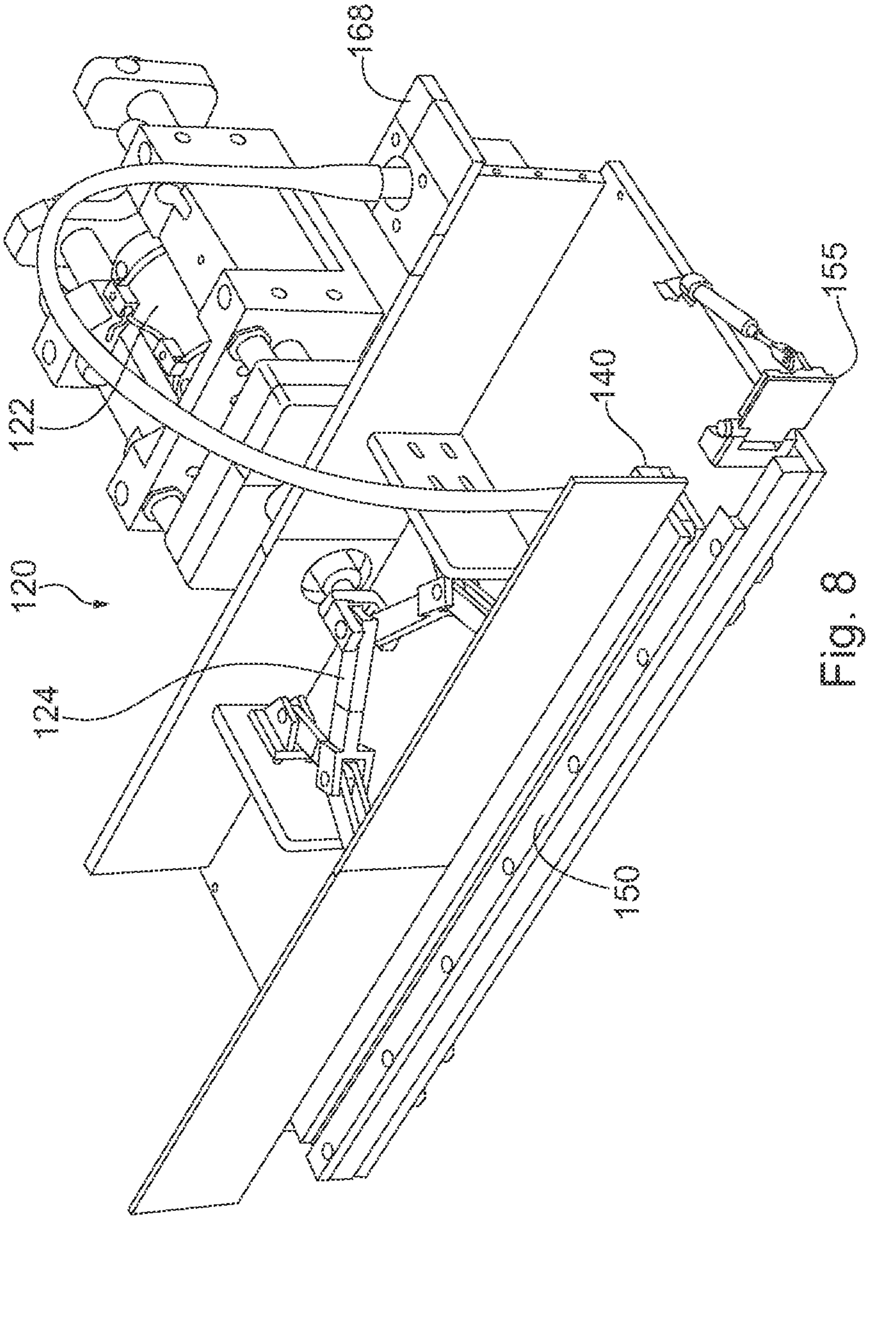
FIG. 8 is an enlarged perspective view of a bending station of the apparatus illustrated in FIG. 1.
Figure 9:
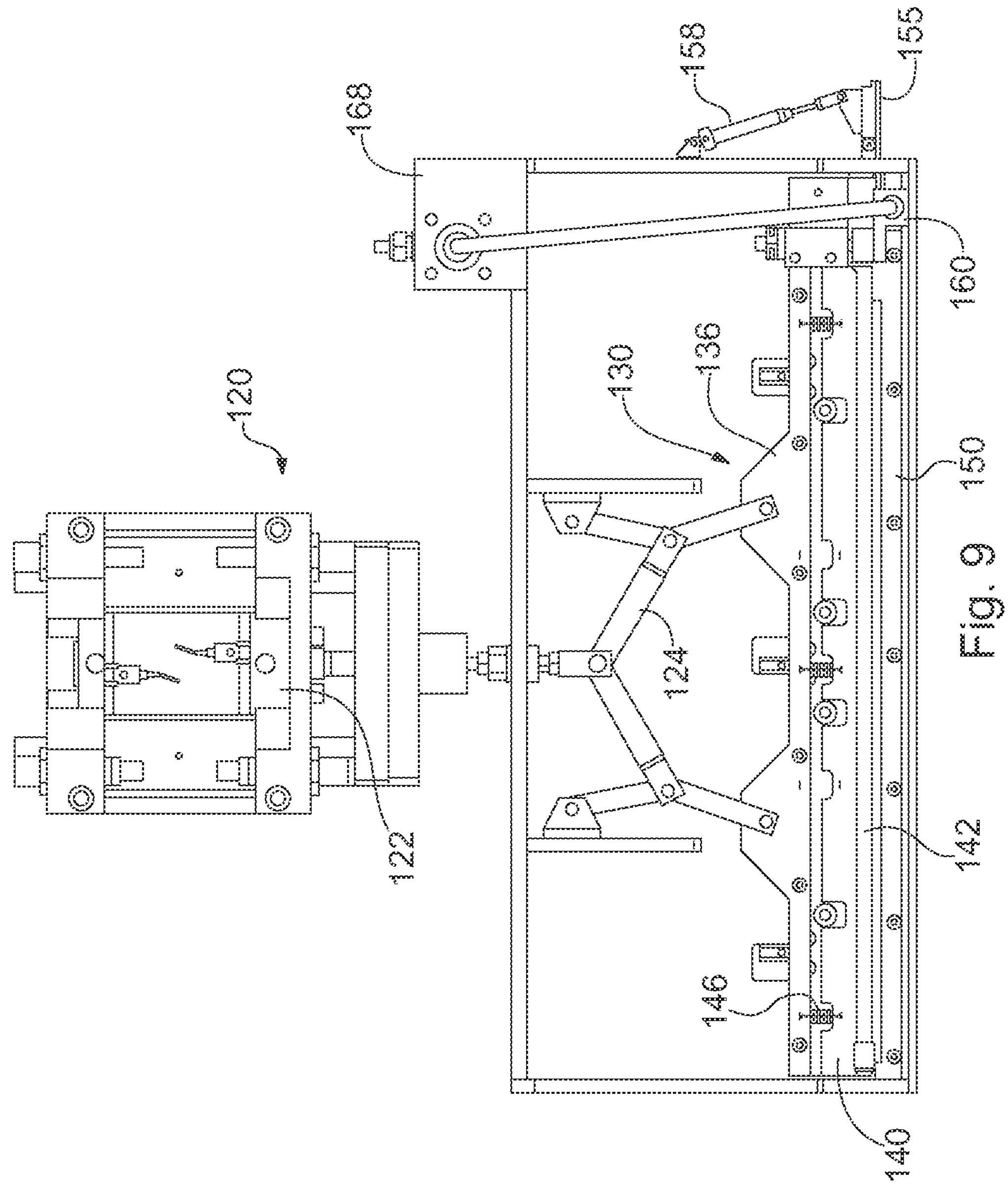
FIG. 9 is an plan view of the bending station illustrated in FIG. 8

Referring to FIGS. 8-9, the blade bending station includes an actuator in the form of a pneumatic cylinder 122 that drives a forming bar 130 over an anvil 150 to bend the blade blank. The pneumatic cylinder is connected to the forming bar by a multi-bar linkage 124 that operates to maintain the forming bar in a parallel relation with the anvil 150 as the forming bar is driven toward the anvil.

Figure 10:
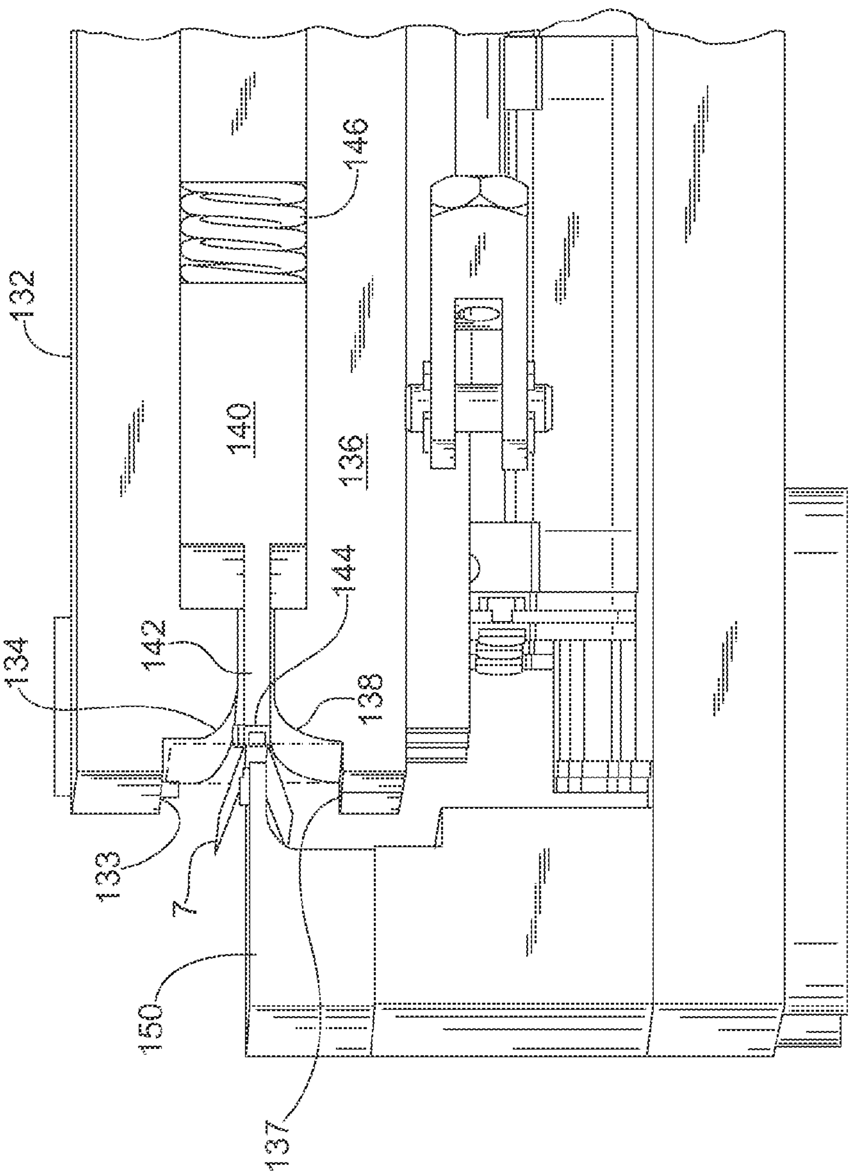
FIG. 10 is an enlarged fragmentary view of the bending station illustrated in FIG. 8.

Referring to FIGS. 8-10, the anvil 150 comprises an elongated shoulder that extends the width of the bending station, so that the anvil is wider than the length of the cutting blade blank. The forming bar may be a solid forming bar having a shape configured to cooperate with the anvil to bend the blade blank into the desired shape. However, in the present instance, the forming bar is a multi-part assembly having an upper forming bar 132 and a lower forming bar 136 with a plunger 140 disposed between the upper and lower forming bar elements.

The upper forming bar element 132 has a recess or shoulder 133 formed in its lower edge adjacent the forward end of the forming bar. A curved surface 134 is formed in the lower edge of the upper forming bar, adjacent the shoulder 133. Similarly, the lower forming bar element 136 has a recess or shoulder 137 formed in its upper edge adjacent the forward end of the forming bar and a curved surface 138 adjacent the recess. As shown in FIG. 10, the recesses 133, 137 in the upper and lower forming bar elements form a guide way for the upper and lower edges of the blade blank.

The forming bar plunger 140 between the upper and lower elements includes an elongated tip 142 that projects outwardly between the curved surfaces 134, 138 of the upper and lower forming bar elements. The plunger tip 142 includes a recess 144 configured to accommodate the teeth of the blade blank so that the teeth do not contact the forming bar 130 during the bending process. As shown in FIG. 10, the plunger tip is vertically aligned with the anvil 150 to support the blade blank opposite the anvil during the forming process.

A plurality of compression springs 146 bias the plunger 140 relative to the upper and lower forming bar elements 132, 136. Specifically, as the plunger bar 130 is driven forwardly, the plunger tip engages the cutting blade blank. Continued forward displacement of the plunger bar causes the springs to compress as the upper and lower forming bar elements continue to be driven over the anvil while the plunger tip maintains contact with the blade blank, so that the blade blank is held between the anvil and the plunger tip.

After the bending operation, the actuator 122 retracts the drive linkage 124, thereby retracting the forming bar 130 away from the anvil 150. The bent blade may have a tendency to pull away with the forming bar as the forming bar retracts from the anvil. However, as forming bar 130 retracts, the compression spring 146 bias the plunger bar 140 forwardly relative to the upper and lower forming bar elements 132, 136 to push the bent blade off of the forming bar. Specifically, the plunger tip 142 drives the blade away from the upper and lower forming bar elements 132, 136 so that the blade remains adjacent the anvil so that the transport can engage the bent blade.

Figure 11:
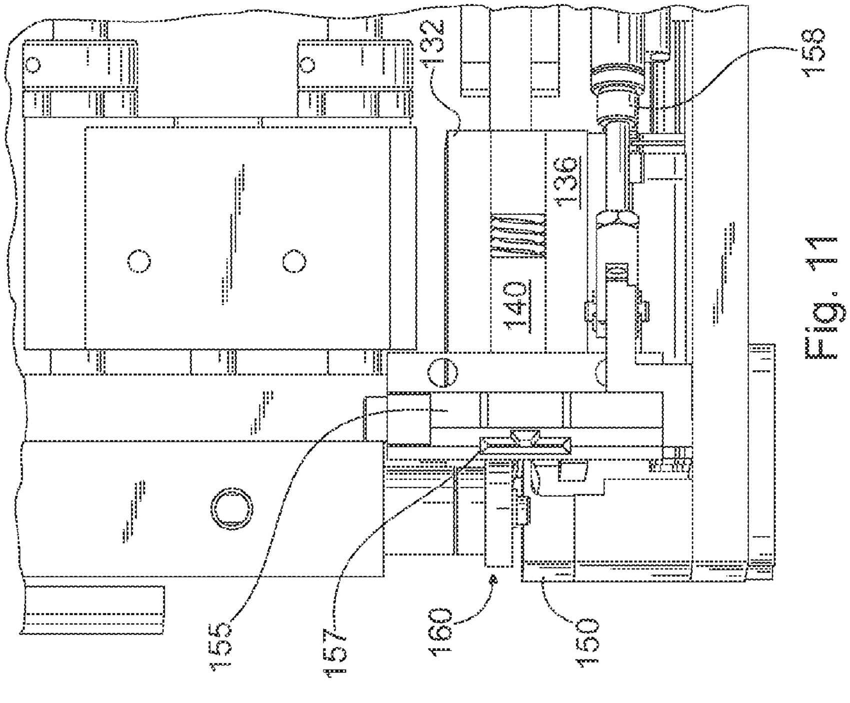
FIG. 11 is an enlarged fragmentary view of the bending station illustrated in FIG. 10 showing a feed guide.

As shown in FIG. 11, the bending station 120 includes a guide block 155 positioned adjacent the input end of the bending station. The guide block 155 is configured to guide the blade blank into the bending station without damaging the cutting teeth formed on the blade blank. Accordingly, in the present instance, the guide block 155 includes a vertically oriented narrow slot 157 having a width that is slightly greater than the thickness of the blade blank and slightly higher than the height of the blade blank. The guide block 155 further includes a channel or recess positioned at a height to accommodate the teeth formed in the blade blank. The recess has a depth that is greater than the height of the teeth formed in the blade blank so that the teeth do not contact the guide block as the blade travels through the guide block. Additionally, as shown in FIG. 11, the input end of the guide slot 157 flares outwardly so that the guide slot is wider at the input end. In this way, the material is more easily fed through the opening at the entrance to the guide block.

The guide block 155 is connected to an actuator so that the guide block can be displaced away from the input end of the bending station 120. Specifically, as shown in FIG. 11, the guide block 155 is pivotably connected to the bending station. Additionally, the actuator is operable to drive the guide block away from the input end of the bending station.

Figure 12:
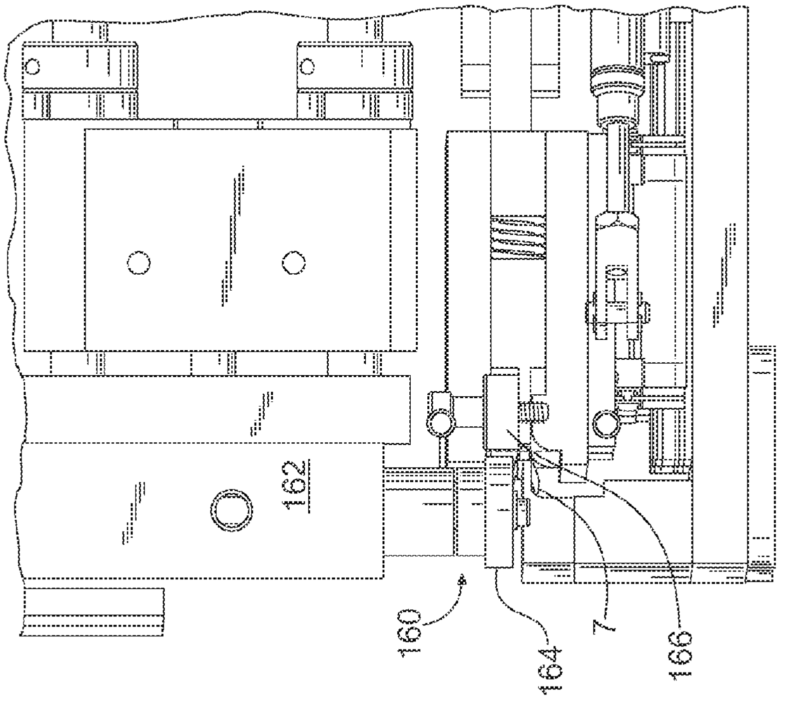
FIG. 12 is an enlarged fragmentary view of the bending station illustrated in FIG. 10 showing a feeder.

Referring now to FIG. 12, the details of the feeder 160 for the bending station 120 are illustrated in greater detail. In FIG. 12, the details of the guide block 155 have been removed to show the details of the feeder.

The feeder 160 for the bending station 120 is a friction feed wheel 164. The feed wheel may be formed of a variety of materials, such as plastic or rubber, for providing a high friction surface to engage the blade blanks. The feed wheel 164 is adjacent an opposing support element, such as an opposing wheel. In the present instance, the feed wheel opposes a rotatable element, such as a rotatable ball bearing assembly 166. In this way, a feed opening is formed between the feed wheel 164 and the bearing 166. The feed opening is slightly less than the thickness of the blade blank. As the blade blank enters the feed opening, the feed wheel compresses slightly so that the blade blank is positively engaged between the feed wheel and the bearing. A drive motor 168 drives the drive wheel 164 which in turn drives the blade blank forwardly into the bending station 120. As shown in FIG. 8, a flexible shaft in a cable transmits the drive force from the drive motor to the drive wheel.

The feeder 160 drives the blade blank into the bending station 120 until the leading edge of the blade blank engages an end stop. Alternatively, or in addition, the bending station 120 may include a sensor for sensing the leading edge of the blade blank. After the sensor detects the presence of the leading edge of the blade blank at or adjacent a pre-determined position adjacent the discharge side of the bending station, the system may stop the feeder 160.

When the blade blank enters the bending station, the blade blank may get caught in the narrow opening between the feed wheel 164 and the bearing 166. If this occurs, the blade blank may bend rather than passing between the feed wheel and the bearing. To provide additional clearance, the feed wheel may be displaceable relative to the bearing or the bearing may be displaceable relative to the feed wheel. In this way, before a blade blank is fed into the bending station, the actuator displaces the feed wheel away from the bearing 166 thereby providing an enlarged feed opening so that the blade blank can readily enter the feeder 160. After the blade blank is fed into the feed opening, the actuator may displace the feed wheel toward the blade blank so that the feed wheel engages the blade blank.

It may be desirable to include a sensor adjacent the feeder 160 for detecting the leading edge of the blade blank. After the sensor detects the leading edge, the actuator 162 may displace the feed wheel 164 toward the blade blank. Similarly, the drive motor 168 may start after the sensor detects the leading edge of the blade blank.

Figure 13:
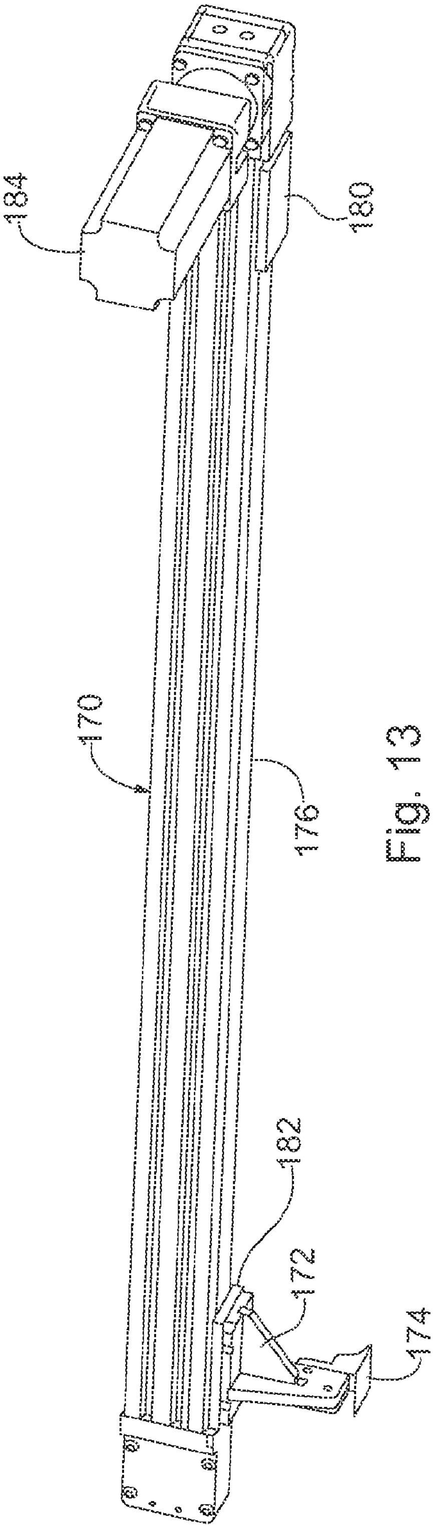
FIG. 13 is an enlarged perspective view of a blade transport of the apparatus illustrated in FIG. 1.

After the blade is bent, the feeder 160 is no longer operable to drive the blade 7. Accordingly, the system includes a blade transport 170 for driving the blade from the bending station to the crimping station 200. Referring to FIG. 13, the blade transport 170 comprises an elongated housing having a channel or guide rail. In the present instance, a guide rail 176 is formed on the lower side of the transport housing. A transport carriage 172 rides on the guide rail 176. The transport carriage includes an engagement pad or finger 174 that is configured to engage or abut the bent blade.

A drive motor 184 drives the carriage 172 along the guide rail 176. When the motor drives the carriage 172 forwardly along the guide rail, the engagement pad 174 contacts the trailing end of the blade in the bender assembly 120 and displaces the blade forwardly into the crimping station 200.

The blade transport 170 includes a home switch 180 adjacent the bending station end of the blade transport. When the carriage 172 engages the home switch a signal is sent to a controller indicating that the carriage is at the home position and ready to transport a blade away from the bending station. When a blank blade is positioned in the bending station, before the blank is bent into form, the engagement finger is configured and positioned so that it will not engage the flat blade blank. If the carriage is not driven toward the home position until after the blade is bent, the engagement pad 174 will engage the formed blade on the trip back to the home position, thereby preventing the carriage from returning to the home position. Therefore, before actuating the bending station to form a blade, the system ensures that the home switch 180 has detected the presence of the carriage.

At the far end of the transport 170 adjacent the crimping station, the transport includes an end switch 182, indicating that the carriage has reached the end of the transport. Upon receiving a signal from the end switch 182 indicating the presence of the carriage, the drive motor 184 reverses to drive the carriage back toward the home position. In this way, the drive motor reciprocally drives the carriage along the guide 176 to feed formed blade 7 from the bending station to the crimping station.

Although the transport 170 has been described as a reciprocally driven element, it should be understood that other drives can be used to transport the bent blades from the bending station 120 to the crimping station 200. For instance, an alternate transport may incorporate a chain wheel mechanism that includes an engagement element for driving the bent blades. The chain drive may be positioned so that a forward run of the chain drives the engagement element forwardly, thereby driving the bent blade forwardly. Additionally, the chain drive can be configured so that on the return run of the chain, the engagement element is clear of the bent blade, so that the engagement element does not contact the blade as it returns to the bending station.

Crimping Station

After the blade 7 is formed, the blade is mated with a cardboard blank 9 and fixedly attached to the cardboard blank. The blade may be connected to the cardboard blank in a variety of ways. For instance, the blade may be compressed together to crimp the blade onto an edge of the cardboard blank. Alternatively, the blank may be staked onto the cardboard blank. In the present instance, the blade is crimped onto the cardboard blank. To accomplish this, the system includes a crimping station 200.

Figure 14:
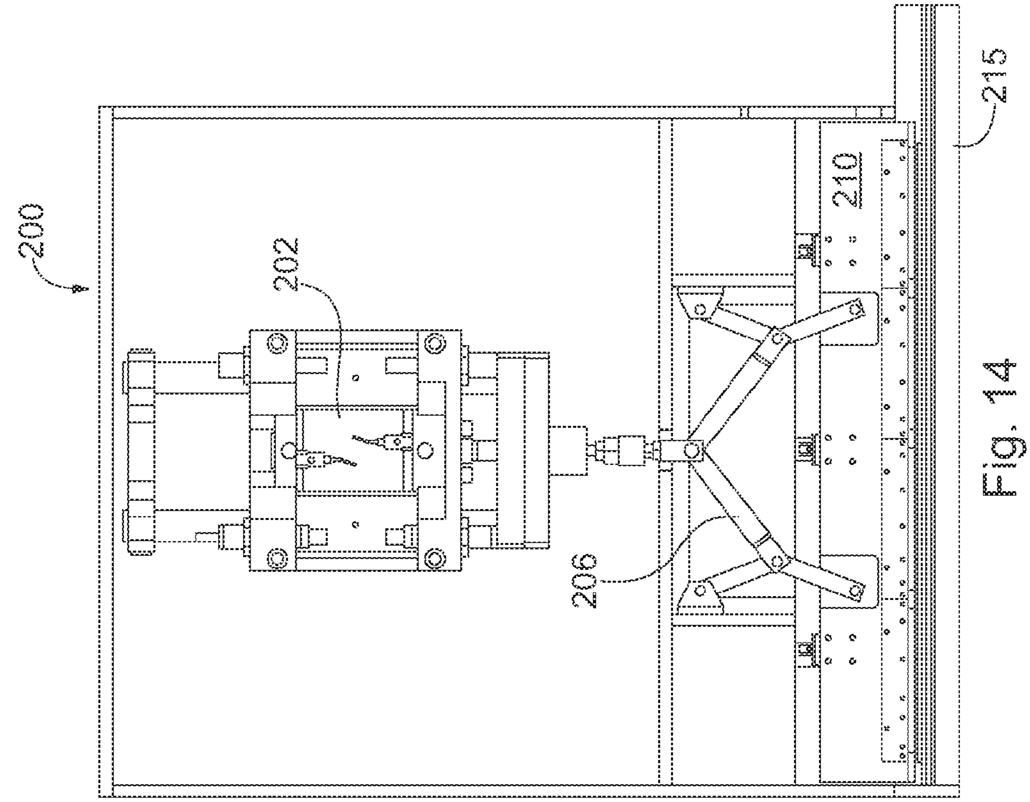
FIG. 14 is an enlarged elevational view of a crimping station of the apparatus illustrated in FIG. 1.
Figure 15:
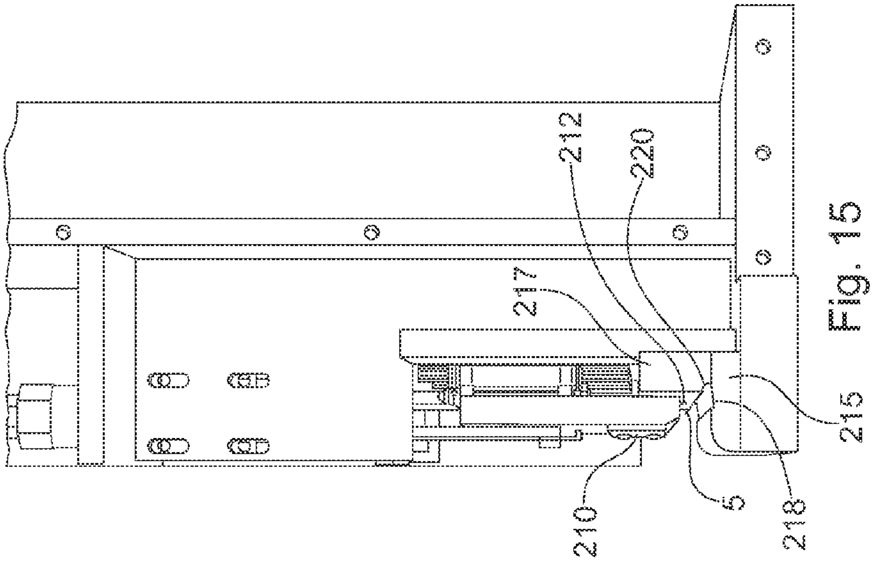
FIG. 15 is an enlarged fragmentary perspective view of the crimping station illustrated in FIG. 14.

Referring to FIGS. 14-15, the crimping station includes an actuator 202, such as a pneumatic cylinder operable to drive a crimping bar 210 toward an anvil 215 to crimp the blade 7 onto a cardboard blank 9. The actuator 202 is connected to the crimping bar 210 by a multi-bar linkage 206 that operates to maintain the crimping bar in a parallel relation with the anvil 215 as the crimping bar is driven toward the anvil.

The anvil 215 includes an angled recess 218 for receiving the bent blade. As shown in FIGS. 10 and 15, in the present instance, the blade is formed into a generally u-shaped channel. The recess 218 in the anvil 215 is formed so that the bent blade sets within the recess with the lower leg of the blade within the recess. In this way, the edge of a cardboard blank can be readily inserted into the opening in the channel of the blade.

In addition to the channel in the anvil 215, a recess 220 is formed in the base of a back wall 217 of the crimping station. The recess 220 includes a channel for accommodating the cutting teeth of the blade 7 so that the cutting teeth do not contact the back wall or the anvil. The back wall 217 abuts the anvil, so that the recess 220 in the back wall 217 and the recess 218 in the anvil 215 cooperate to form a pocket for receiving and supporting the blade during the crimping process.

In order to attach the blade 7 onto a cardboard blank 9, an edge of the cardboard blank is inserted into the open end of the channel formed in the blade. After the blank is inserted into the channel of the blade, the actuator 202 drives the linkage 206 which in turn drives the crimping bar 210 downwardly toward the anvil 215. The crimping bar 210 compresses the two legs of the blade together, deforming the blade so that it pinches on the cardboard blank. In this way, the blade is crimped onto the cardboard blank.

It may also be desirable to stake the blade onto the cardboard blank. Accordingly, the crimper bar includes a plurality of staking elements, such as conical points 212 that project downwardly from the crimping bar toward the anvil. The staking points 212 are spaced apart along the width of the crimping bar. Additionally, the anvil 215 includes a plurality of recess configured to mate with the staking points on the crimping bar.

When the crimping bar 210 is displaced down onto the blade 7, the staking points 212 pierce through the upper leg of the cutting blade and into the cardboard. By piercing the metal blade, the pierced metal deforms into the cardboard to form stakes that grip into the cardboard.

Method of Operation

Configured as described above, the system 10 provides a method for attaching cutting blades 7 onto substrates 9, such as cardboard boxes. Specifically, the system 10 provides for automatically and rapidly forming a cutting blade 7 registering a substrate at the proper position relative to the cutting blade and attaching the cutting blade to the substrate. For instance, the system 10 may feed the substrates and form the blade in parallel at a rate to produce approximately 50 finished blade assemblies 5 per minute.

Specifically, a stack of substrates or blanks is loaded into a feeder 20, which serially conveys the blanks to a transport that transports the blanks toward a crimping station 200. While each blank is being transported from the feeder 20 to the crimping station 200, a cutting blade 7 is formed that is to be mounted onto the blank. The blade is formed by feeding a length of cutting blade stock from a coil. Specifically, a cutting blade stock feeder 90 drives a strip of cutting blade stock into and through the cutting station 100 and into the input end of the bending station 120. After the length of blade stock is fed, the stock feeder 90 stops feeding the stock. The cutting station then severs the length of blade stock.

After the length of blade stock is severed, the feed assembly 160 of the bending station 120 drives the blade blank into the bending station. In the present instance, the feed assembly is displaced toward the blade blank to engage the blade blank. The feed assembly 160 then feeds the blade blank into the bending station 120 until the leading edge of the blade blank engages an end stop. The feed assembly then stops feeding the blank and displaces away from and out of engagement with the blade blank.

After the blade blank is fed into the bending assembly, the actuator 122 drives the forming bar 130 toward the anvil 150. As the forming bar 130 drives toward the anvil, the forming bar engages the flat blade blank. The forming curve 134 of the upper forming element 132 engages the upper portion of the blade blank, deforming the upper portion to form an upper leg. The forming curve 138 of the lower forming element 136 engages the lower portion of the blade blank, deforming the lower portion to form a lower leg. In this way, the forming bar 130 deforms the flat blade blank into a generally u-shaped channel wherein the cutting teeth of the cutting blade are located on a web formed at the intersection of the legs of the channel.

After the blade is formed at the bending station, the blade transport 170 drives the blade to the crimping station. Specifically, after receiving a signal indicating that the actuator 122 has retracted the forming bar away from the anvil, the drive motor 184 of the blade transport 170 drives the carriage 172 forwardly along the guide rail 176. As the carriage is driven forward, the engagement finger 174 contacts the trailing end of the formed blade and drives the blade forwardly.

The blade transport 170 drives the blade forwardly into a pocket formed in the anvil 215 and back wall 217 of the crimping station. After the carriage 172 reaches the end of the transport rail 176, the carriage contacts the end switch 182. In response to a signal from the end switch, the transport motor 184 reverses the carriage 172, driving the carriage back to the home position so that it is ready to transport the next bent blade.

The system is configured to ensure that the bending station 120 does not bend a blade until the carriage 172 has returned to the home position. Accordingly, the bending station 120 operates in response to a signal indicating the location of the carriage. For instance, in the present instance, when the carriage contacts the home switch 180, a signal is sent to a central controller that controls the operation of the bending station. In response to the signal from the home switch, the bending station commences a forming procedure if a blade blank is in position in the bending station.

Returning to the crimping station 200, after the blade is transported to the crimping station, the blade is mated with a cardboard blank 9. Specifically, as noted above, the substrate transport 40 conveys the blanks from the output of the feeder 20 to the crimping station. More specifically, the transport 40 conveys the blanks to the transverse transport 60. Once the blank arrives at the transverse transport, the transverse transport 60 actuates, thereby driving an edge of a cardboard blank transverse the direction of the conveyor belts 42 and toward the crimping station 200. The transverse transport 60 drives the blank transversely until the edge of the blank is inserted into the open end of the channel formed in the blade 7.

After the edge of the blank is inserted into the blade, the actuator drives the crimping bar 210 toward the anvil 215. The piercing points 212 of the anvil pierce the cutting blade thereby staking the blade onto the cardboard. Additionally, the crimping bar 210 deforms the legs of the blade together thereby crimping the blade onto the cardboard.

After the actuator retracts the forming bar, a signal is sent to the central controller indicating that the crimping/staking procedure is completed. The transverse transport 60 then reverses to drive the blank and the attached blade away from the crimping station. The blank conveyor 20 then conveys the completed blade assembly 5 toward the output end 48 of the conveyor. The conveyor then discharges the blade assembly into an output bin in which the blade assemblies are stacked.

It will be recognized by those skilled in the art that changes or modifications may be made to the above-described embodiments without departing from the broad inventive concepts of the invention. For instance, in the foregoing description, the system includes a feeder 20 that feeds cardboard blanks to a cardboard transport that then transports the blanks to a crimping station. At the crimping station, the blank is mated with a cutting blade and the cutting blade is attached to the blank. Alternatively, rather than feeding the blank along the length of the system, the feeder may be positioned adjacent the crimping station so that the feeder feeds the blanks directly to the crimping station. It should therefore be understood that this invention is not limited to the particular embodiments described herein, but is intended to include all changes and modifications that are within the scope and spirit of the invention as set forth in the claims.

The invention claimed is:

1. An apparatus for forming cutting blades and affixing the cutting blades onto substrates, comprising:

- a feeder for feeding cutting blade material from a supply of cutting blade stock;
- a cutting station for receiving the cutting blade material from the feeder and severing the cutting blade material from the supply to form a cutting blade blank;
- a bending station for receiving the cutting blade blank and bending the cutting blade blank to form a cutting blade having a web with a plurality of teeth projecting from the web, and a leg extending transverse the web;
- a substrate feeder having an input bin for receiving a stack of substrates onto which the cutting blade is to be attached, wherein the substrate feeder is operable to serially feed substrates from the input bin;
- an affixing station for receiving the cutting blade from the bending station and one of the substrates from the substrate feeder, wherein the one substrate has a first edge having a thickness and the cutting blade mates with the one substrate so that the web of the cutting blade overlies the thickness of the first edge, wherein the affixing station is operable to substantially permanently affix the cutting blade to the one substrate.

2. The apparatus of claim 1 comprising a transport for transporting the cutting blade and affixed substrate away from the affixing station to a discharge area.

3. The apparatus of claim 1 wherein the bending station is operable to bend the cutting blade blank to form a second leg extending transverse the web.

4. The apparatus of claim 3 wherein the affixing station comprises a crimping bar operable to crimp the two legs of the cutting blade together to mount the cutting blade onto the substrate.

5. The apparatus of claim 4 wherein the affixing station includes a staking element for piercing the cutting blade to stake the cutting blade to the substrate.

6. The apparatus of claim 1 wherein the bending station comprises a forming bar displaceable relative to an anvil.

7. The apparatus of claim 6 wherein the bending station comprises a displaceable feeder operable to feed the cutting blade blank into the bending station, wherein the displaceable feeder is displaceable away from a path of the cutting blade blank so that the displaceable feeder does not interfere with the cutting blade blank.

8. The apparatus of claim 7 comprising a blade transport for transporting the cutting blade to the affixing station after the bending station bends the cutting blade blank to form the cutting blade.

9. The apparatus of claim 8 wherein the blade transport comprises a displaceable engagement element operable to engage the cutting blade and push the cutting blade toward the affixing station.

10. The apparatus of claim 6 wherein one of the anvil and the forming bar comprises an elongated recess for receiving the teeth of the cutting blade blank so that the teeth do not engage the anvil or the forming bar during the bending of the cutting blade blank.

11. The apparatus of claim 1 comprising a transport for receiving substrates from the substrate feeder and conveying the substrates to the affixing station, wherein the transport comprises a first section operable to convey the substrate in a first direction, and a second section operable to convey the substrate in a second direction that is transverse the first direction.

12. The apparatus of claim 11 wherein the second section is configured to convey the substrate into the affixing station to mate the substrate with the cutting blade at the affixing station.

13. The apparatus of claim 12 wherein the second section of the transport is reversible to convey the substrate and attached cutting blade away from the affixing station.

14. The apparatus of claim 1 comprising a transport for transporting the substrate, wherein the bending station is operable to bend the cutting blade blank to form a channel having an open end, and wherein the transport is operable to transport the first edge of the substrate into the open end of the channel.

15. The apparatus of claim 14 wherein the affixing station is operable to crimp the channel together to affix the cutting blade to the substrate.

16. The apparatus of claim 1 wherein the supply of cutting blade stock is a coil of overlapping convolutions of cutting blade material.

17. The apparatus of claim 1 wherein the affixing station comprises a crimping bar displaceable relative to an anvil for deforming the cutting blade.

18. The apparatus of claim 17 wherein one of the crimping bar and the anvil comprises a recess for receiving the teeth of the cutting blade so that the teeth do not engage the anvil or the crimping forming bar during the affixing of the blade to the substrate at the affixing station.

19. A method for forming cutting blades and affixing the cutting blades onto substrates using the apparatus of claim 1, wherein the method comprises the steps of:

- feeding the cutting blade material from the supply of cutting blade stock;
- severing the cutting blade material from the supply to form the cutting blade blank;
- bending the cutting blade blank to form the cutting blade having the leg extending transverse the web, wherein the cutting blade comprises a plurality of teeth projecting from the web away from the leg;
- serially feeding the substrate to a transport, each substrate having a first edge having a thickness, and a cutting blade is to be attached to the substrate;
- mating the cutting blade with the substrate so that the cutting blade overlies the thickness of the first edge; and
- permanently affixing the cutting blade to the substrate after the step of mating the cutting blade with the substrate.

20. The method of claim 19 wherein the step of bending the cutting blade blank comprises the step of bending a second leg to form a channel.

21. The method of claim 20 comprising the step of inserting the first edge of the substrate into the channel formed in the cutting blade.

22. The method of claim 21 wherein the step of affixing the cutting blade comprises the step of crimping the channel of the cutting blade.

23. The method of claim 22 wherein the step of crimping comprises displacing a crimping bar towards an anvil to deform at least one of the legs toward the other leg.

24. The method of claim 23 comprising the step of locating the teeth of the cutting blade in a recess in the anvil or the crimping bar to impede contact between the teeth of the blade and the anvil or the crimping bar during the step of crimping.

25. The method of claim 19 wherein the step of affixing comprises piercing the leg of the cutting blade to stake the cutting blade to the substrate.

* * * * *